(12) United States Patent
Tung et al.

(10) Patent No.: US 12,541,674 B2
(45) Date of Patent: Feb. 3, 2026

(54) METHOD AND NON-TRANSITORY COMPUTER READABLE MEDIUM FOR COMPUTE-IN-MEMORY MACRO ARRANGEMENT, AND ELECTRONIC DEVICE APPLYING THE SAME

(71) Applicant: Novatek Microelectronics Corp., Hsinchu (TW)

(72) Inventors: Chien Te Tung, Taipei (TW); Chih Feng Juan, New Taipei (TW); Jen-Wei Liang, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 916 days.

(21) Appl. No.: 17/743,476

(22) Filed: May 13, 2022

(65) Prior Publication Data
US 2022/0366216 A1    Nov. 17, 2022

Related U.S. Application Data

(60) Provisional application No. 63/187,952, filed on May 13, 2021.

(51) Int. Cl.
*G11C 11/54* (2006.01)
*G06F 7/499* (2006.01)
(Continued)

(52) U.S. Cl.
CPC ....... *G06N 3/0464* (2023.01); *G06F 7/49942* (2013.01); *G11C 7/1006* (2013.01);
(Continued)

(58) Field of Classification Search
CPC ...... G06N 3/04; G06N 3/0464; G11C 7/1012; G11C 7/109; G11C 7/1006; G11C 5/025; G11C 11/54; G06F 15/7821
See application file for complete search history.

(56) References Cited

U.S. PATENT DOCUMENTS 10,915,298 B1    2/2021    Far
10,943,652 B2    3/2021    Lu et al.
(Continued)

FOREIGN PATENT DOCUMENTS

CN    111126579    5/2020
CN    112580774    3/2021
(Continued)

OTHER PUBLICATIONS

"Office Action of Taiwan Counterpart Application", issued on Jul. 8, 2022, p. 1-p. 3.
(Continued)

*Primary Examiner* — Mushfique Siddique
(74) *Attorney, Agent, or Firm* — JCIPRNET (57) ABSTRACT

A method and a non-transitory computer readable medium for CIM arrangement, and an electronic device applying the same are proposed. The method for CIM arrangement includes to obtain information of the number of CIM macros and information of the dimension of each of the CIM micros, to obtain information of the number of input channels and the number of output channels of a designated convolutional layer of a designate neural network, and to determine a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels.

12 Claims, 8 Drawing Sheets

(51) Int. Cl.
 *G06N 3/0464* (2023.01)
 *G11C 7/10* (2006.01)
(52) U.S. Cl.
 CPC .......... *G11C 7/1012* (2013.01); *G11C 7/1063* (2013.01); *G11C 7/109* (2013.01); *G11C 11/54* (2013.01)

(56) References Cited

U.S. PATENT DOCUMENTS

| | | | |
|---|---|---|---|
| 11,354,123 | B2 | 6/2022 | Chang et al. |
| 12,120,331 | B2 | 10/2024 | Kang et al. |
| 2018/0285715 | A1* | 10/2018 | Son ........................ G06N 3/045 |
| 2018/0341495 | A1* | 11/2018 | Culurciello ............ G06N 3/063 |
| 2018/0374541 | A1 | 12/2018 | Jung et al. |
| 2019/0362787 | A1 | 11/2019 | Lu et al. |
| 2020/0193293 | A1* | 6/2020 | Song ........................ G06F 7/74 |
| 2020/0242459 | A1* | 7/2020 | Manipatruni ........... G06F 17/16 |
| 2021/0064234 | A1 | 3/2021 | Zhang et al. |
| 2021/0089865 | A1 | 3/2021 | Wang et al. |
| 2021/0117187 | A1 | 4/2021 | Chang et al. |
| 2021/0210138 | A1 | 7/2021 | Lu et al. |
| 2022/0223199 | A1* | 7/2022 | Gu ........................... G11C 7/16 |
| 2022/0321900 | A1 | 10/2022 | Kang et al. |
| 2022/0351032 | A1* | 11/2022 | Chou ........................ G11C 5/02 |
| 2022/0366947 | A1* | 11/2022 | Tung .................... G11C 7/1063 |
| 2022/0400222 | A1* | 12/2022 | Nakagawa ............. H04N 25/41 |
| 2023/0074229 | A1* | 3/2023 | Jia ........................ G06F 15/7821 |
| 2024/0061649 | A1* | 2/2024 | Kwon .................. G11C 7/1006 |
| 2024/0111828 | A1* | 4/2024 | Kim ........................ G06N 3/063 |

FOREIGN PATENT DOCUMENTS

| | | |
|---|---|---|
| TW | 202013213 | 4/2020 |
| TW | 202117561 | 5/2021 |
| WO | 2021027238 | 2/2021 |

OTHER PUBLICATIONS

Xiaochen Peng et al., "Optimizing Weight Mapping and Data Flow for Convolutional Neural Networks on Processing-In-Memory Architectures", IEEE Transactions on Circuits and Systems—I: Regular Papers, Apr. 2020, pp. 1333-1343, vol. 67, No. 4.

"Office Action of China Counterpart Application", issued on May 29, 2025, p. 1-p. 12.

"Notice of allowance of China counterpart Application", issued on Sep. 12, 2025, p. 1-p. 4.

Li Danqing, "Design and Optimization of Reconfigurable Array for DCT and IDCT", A thesis submitted to Southeast University, China Outstanding Master's Thesis Full-text Database, Information Technology vol. Issue No. 1 of 2021, Date of Publication: Jan. 15, 2021.

* cited by examiner

METHOD AND NON-TRANSITORY COMPUTER READABLE MEDIUM FOR COMPUTE-IN-MEMORY MACRO ARRANGEMENT, AND ELECTRONIC DEVICE APPLYING THE SAME

CROSS-REFERENCE TO RELATED APPLICATION

This application claims the priority benefit of U.S. Provisional application Ser. No. 63/187,952, filed on May 13, 2021. The entirety of the above-mentioned patent application is hereby incorporated by reference herein and made a part of this specification.

TECHNICAL FIELD

The disclosure relates to a method and a non-transitory computer readable medium for compute-in-memory (CIM) arrangement, and an electronic device applying the same.

BACKGROUND

CIM is a technology used to solve the bandwidth versus computation mismatching problem within the popular and well-used von-Neumann processor/architecture. By combining memory and computation in the same block, the bandwidth mismatching problem can be solved. However, due to high computation requirements for a convolution neural network, multiple CIM macros would and should be used, but the horizontal/vertical ratio for multiple CIM macros is fixed and cannot be adjusted according to different numbers of input channels and output channels for different convolution computations, and the fixed ratio is not optimized for computation power/energy metrics.

SUMMARY OF THE DISCLOSURE

A method and a non-transitory computer readable medium for CIM arrangement, and an electronic device applying the same are proposed.

According to one of the exemplary embodiments, the method for CIM arrangement includes to obtain information of the number of CIM macros and information of the dimension of each of the CIM micros, to obtain information of the number of input channels and the number of output channels of a designated convolutional layer of a designate neural network, and to determine a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels.

According to one of the exemplary embodiments, the electronic apparatus includes CIM macros and a processing circuit. The CIM macros are arranged in a predetermined CIM macro arrangement based on the number of the CIM macros, the dimensions of each of the CIM macros, and the number of input channels and the number of output channels of a designated convolutional layer of a designated neural network. The processing circuit is configured to load weights in the arranged CIM macros and input multiple input channels of one input feature map into the arranged CIM macros with the loaded weights for a convolutional operation to generate an output activation of one of multiple output feature maps.

According to one of the exemplary embodiment, the non-transitory computer readable medium stores a programming causing a computer to obtain information of the number of CIM macros and information of the dimension of each of the CIM micros, to obtain information of the number of input channels and the number of output channels of a designated convolutional layer of a designate neural network, and to determine a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

A common form of deep neural networks (DNNs) are convolutional neural networks (CNNs), which are composed of multiple convolutional layers. In such networks, each convolutional layer takes input activation data and generates higher-level abstraction of the input data, called a feature map, which preserves essential yet unique information. Each of the convolutional layers in CNNs is primarily composed of high-dimensional convolutions. For example, FIG. 1 illustrates convolutions in CNNs.

Figure 1:
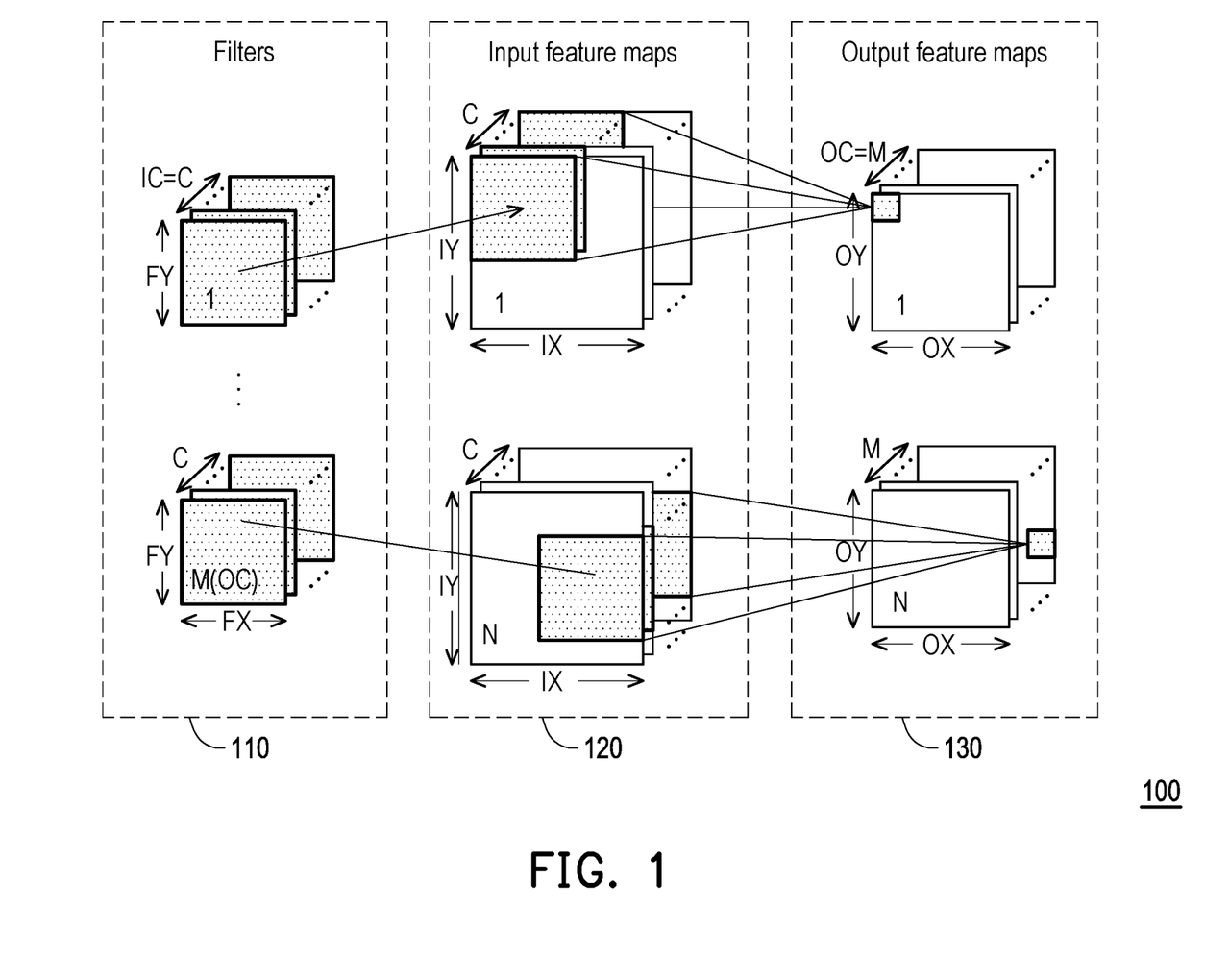
FIG. 1 illustrates convolutions in CNNs.

Referring to FIG. 1, in this computation 100, the input activations of a layer are structured as a set of 2D input feature maps having multiple channels (IX×IY with C channels), each of which is called an input channel. Each input channel is convolved with a distinct 2D filter (i.e. a kernel) from the stack of 2D filters. This stack of 2D filters is also referred to as a single 3D filter. Multiple 3D filters 110 (M filters with dimension FX×FY×C) are convolved with the input feature maps 120. The results of the convolution of each point are summed across all the input channels. The result of this computation is an output activation of an output channel (i.e., one output feature map with dimension OX×OY). In other words, the 3D filters 110 are applied to 3D input feature maps 120 (with a batch size N) to create N output feature maps 130. For different layers in different DNNs, the number of input channels (denoted by C or IC) and the number of output channels (denoted by M or OC) would vary a lot depending on different parameter designs. However, the CIM macro arrangement for multiple CIM macros in the existing art is fixed and irreverent with the input/output channel number of convolution.

To solve the prominent issue, some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 2:
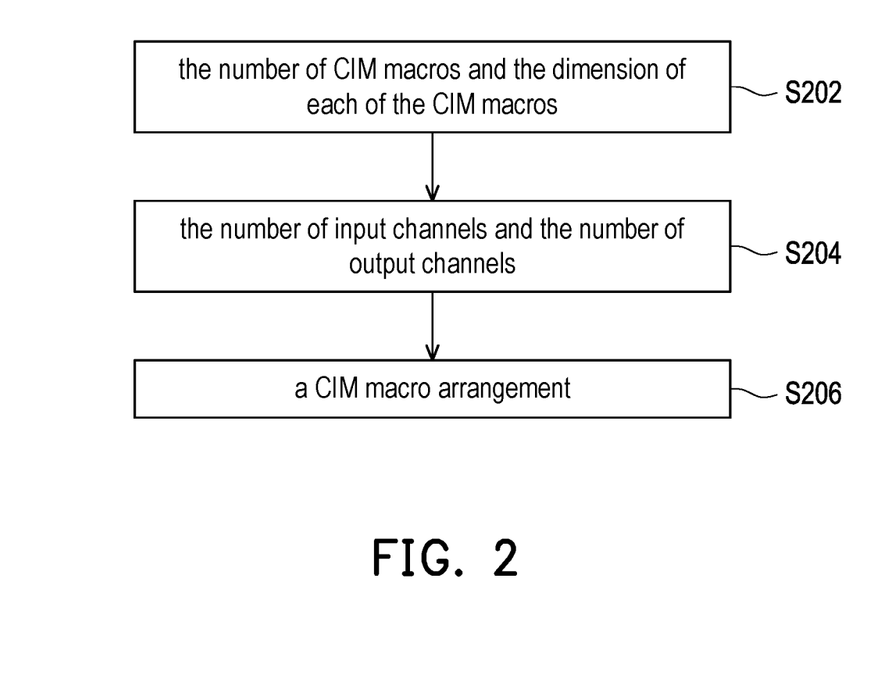
FIG. 2 illustrates a flowchart of a proposed method for CIM arrangement in accordance with one of the exemplary embodiments of the disclosure.

FIG. 2 illustrates a flowchart of a proposed method for CIM arrangement in accordance with one of the exemplary embodiments of the disclosure. The steps in FIG. 2 would be implemented by a computer system in a product development stage.

Referring to FIG. 2, information of the number of CIM macros and information of the dimension of each of the CIM macros are obtained (Step S202), and information of the number of input channels and the number of output channels of a designated convolutional layer of a designated neural network are obtained (Step S204). Next, a CIM macro arrangement for arranging the CIM macros for applying convolution operation to the input channels to generate the output channels are determined according to the number of the CIM macros, the dimension of each of the CIM macros, the number of the input channels and the number of the output channels of the designated convolutional layer of the designated neural network (Step S206). That is, by providing dynamic CIM shape configuration in hardware, a CIM shape decider implemented as a module in software may take the input channels and the output channels as input and decide which CIM shape configuration is able to generate an optimum configuration.

In the present exemplary embodiment, the CIM macro arrangement capable of performing a convolution of multiple filters and the input channels is determined according to latency, energy consumption, and utilization. The latency is associated with at least one of a DRAM latency, a latency for loading weights into the CIM macros, and a processing time of the CIM macros. Herein, the weights means parameters of the filters, and the number of parameters of the filters equals to FX×FY×IC×OC. Energy is a factor representing energy cost for computing a convolution layer by using a type of CIM macro arrangement, and the energy consumption is associated with energy cost for accessing at least one memory including an on-chip SRAM which is in the same chip as the CIM macros and a DRAM is outside the chip. The utilization is a ratio of used part of the CIM macros to all of the CIM macros. For example, a ratio of DRAM:SRAM:CIM=200:6:1 means that it coasts 6 times the energy cost for accessing CIM to access RAM based on accessing the same amount of data.

In one scenario, the determined CIM macro arrangement may provide a summation of the vertical dimension of all the CIM macros adapted for performing the convolution of the filters and the input channels of the designated convolution layer by a minimum number of times for batch loading the input channels. In another scenario, the determined CIM macro arrangement may provide a summation of the horizontal dimension of all the CIM macros adapted for performing the convolution of the filters and the input channels of the designated convolution layer by a minimum number of times for batch loading the filters.

Figure 3:
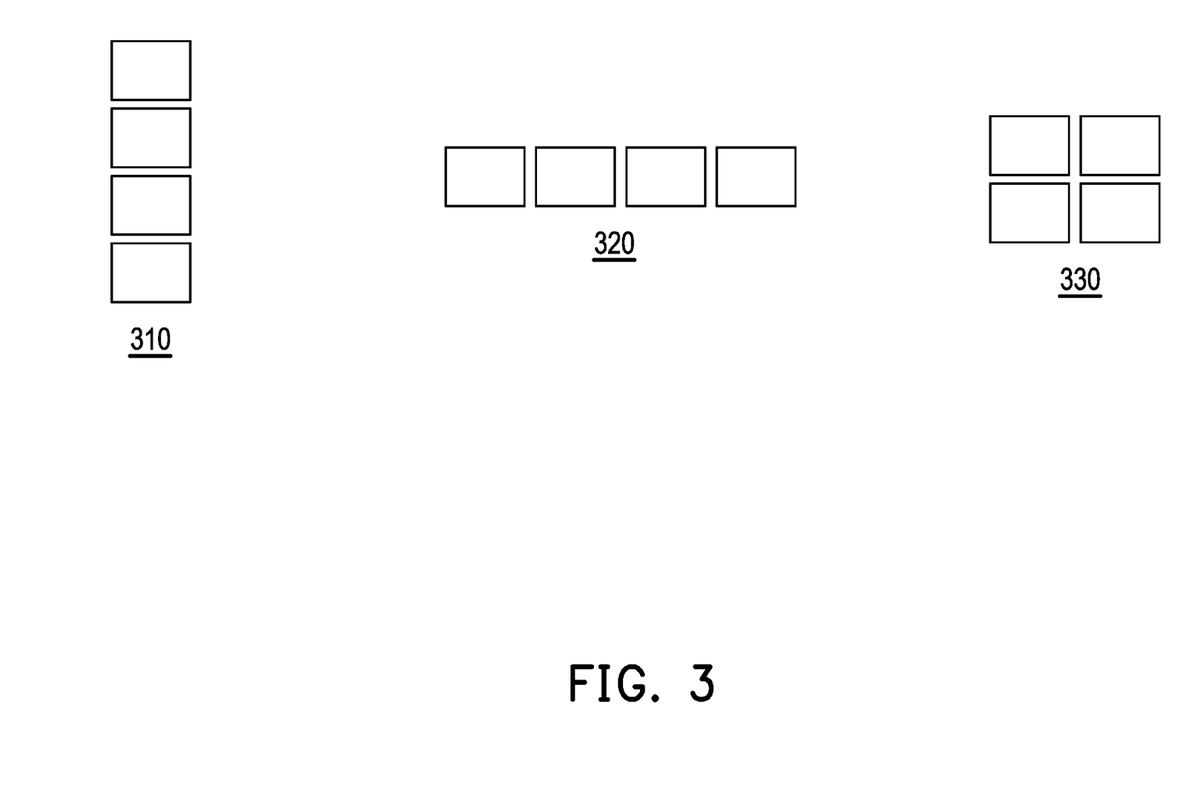
FIG. 3 illustrates different CIM arrangements in accordance with one of the exemplary embodiments of the disclosure.

For intuitive explanation of how to effectively use multiple CIM macros to maximize computation performance, FIG. 3 illustrates different CIM arrangements in accordance with one of the exemplary embodiments of the disclosure.

Referring to FIG. 3, each convolutional layer of a CNN network may have a respective configuration of input/output channels. Assume that the number of CIM macros is 4 and each CIM macro having 256 rows and 64 columns of CIM cells. If the number of input channels is more than the number of output channels, it may be more efficient to use the CIM macros in a vertical arrangement 310. If the number of output channels is more the number of input channels, it may be more efficient to use CIM macros in a horizontal arrangement 320. If the number of input channels is equal to the number of output channels, it may be more efficient to use CIM macros in a square arrangement 330.

Figure 4:
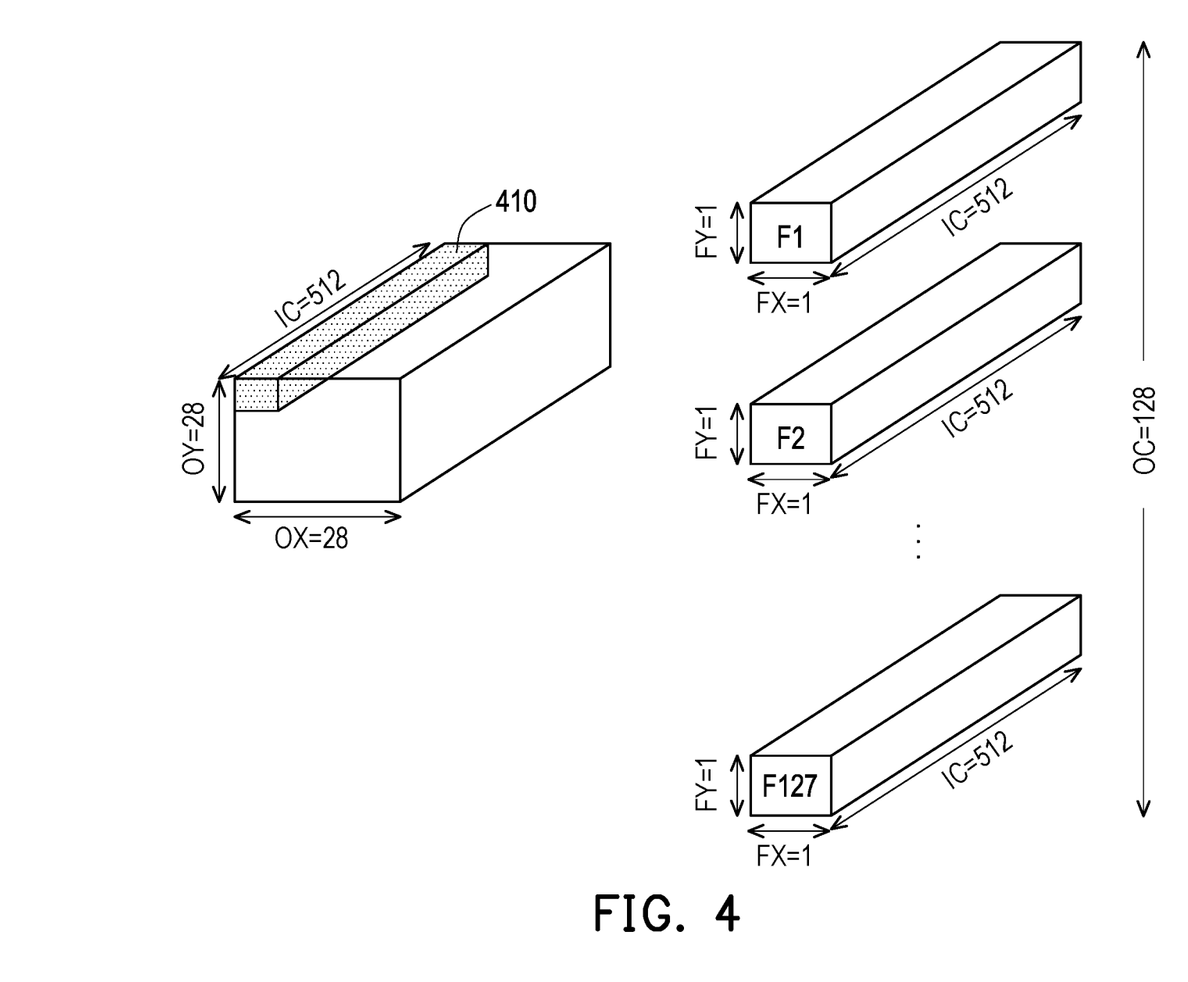
FIG. 4 illustrates a convolution operation in accordance with one of the exemplary embodiments of the disclosure.

For better comprehension, FIG. 4 illustrates a convolution operation in accordance with one of the exemplary embodiments of the disclosure.

Referring to FIG. 4, assume that IC=512, OX=28 and OY=28 for input data, FX=1, FY=1 for filters F0-F127, and OC=128, IX=1, IY=1. In a case of using two macros, each macro having 256 rows and 64 columns, an efficient CIM macro arrangement for computing the convolution may be a vertical CIM arrangement as illustrated in FIG. 5 in accordance with one of the exemplary embodiments of the disclosure.

Figure 5:
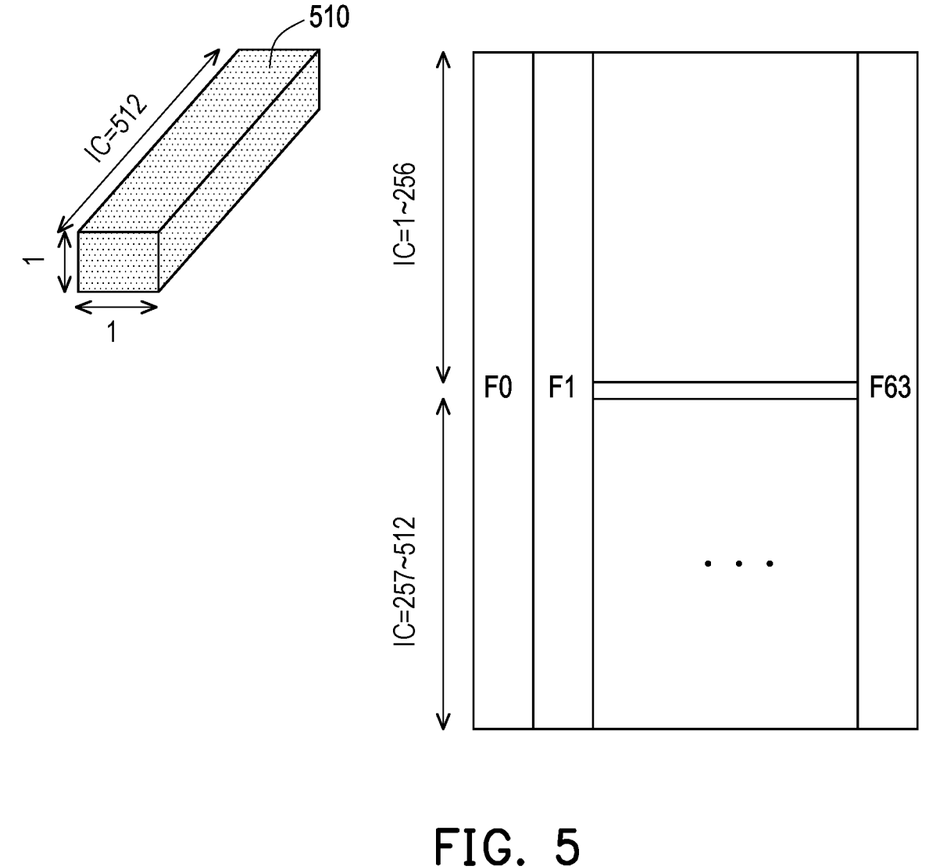
FIG. 5 illustrates a vertical CIM arrangement in accordance with one of the exemplary embodiments of the disclosure.

Referring to FIG. 5, 64 filters F0, F1, . . . F63 are stored in the CIM macros in advance. The input channels 1-256 are input to the first CIM macro (the upper CIM macro) and the input channels 257-512 are input to the second CIM macro (the lower CIM macro). In other words, data of an input cube 510 with dimension 1×1×512 (corresponding to data of an input cube 410 in FIG. 4) are split into two parts and respectively input to each column (each of which stores a filter) of the first CIM macro and the second CIM macro for multiplication operation. With respect to each of the first CIM macro and the second CIM macro, 256 multiplication results of each column are summed by the CIM macro to be an output value, and an external circuit may add the two output values as a summation of 512 multiplication results to generate a convolution output. Thus, the first CIM macro and the second CIM macro as a whole can generate 64 convolution outputs. For example:

For the column of the filter F0, $$\text{Output}[OX=0][OY=0][OC=0] = \Sigma_{IC=0}^{IC=512} F0(IC) \times \text{Input}(OX=0, OY=0, IC), \text{ and}$$

For the column of the filter F1, $$\text{Output}[OX=0][OY=0][OC=1] = \Sigma_{IC=0}^{IC=512} F1(IC) \times \text{Input}(OX=0, OY=0, IC).$$

The convolution operation for the remaining 64 filters F65, F66, . . . , F127 would be similar.

In the same case of using two CIM macros, each CIM macro having 256 rows and 64 columns, horizontally-arranged CIM macros can also be used for computing the convolution. In such a case, the first-half input channels 1-256 may be input to each column of total 128 columns (which respectively store 128 filters in advance) of the two horizontally-arranged CIM macros, and 256 multiplication results of each column are summed by the CIM macro to be an output value. However, such an output value cannot be as a complete convolution output since the second-half input channels 257-512 are not calculated yet. These output values (incomplete convolution outputs) have to be stored in an accumulation buffer (either SRAM or DFFs). Until the convolution operation for the second-half input channels 257-512 are also completed, two parts of incomplete convolution outputs are added to generate 128 convolution outputs. In such as case, more energy is spent on accessing the accumulation buffer, so it is less efficient than using the two vertically-arranged CIM macros.

Next, assume that the number of input channels is 128 and the number of output channels is 512. Since each micro has 256 rows (which is greater than 128), it is not necessary to arrange two CIM macros vertically. A single CIM macro would be able to complete the convolution operation for input channels 1-256 (i.e. the utilization for a single CIM macro is only 50%). In this case, an efficient CIM macro arrangement for computing the convolution may be a horizontal CIM arrangement as illustrated in FIG. 6 in accordance with one of the exemplary embodiments of the disclosure.

Figure 6:
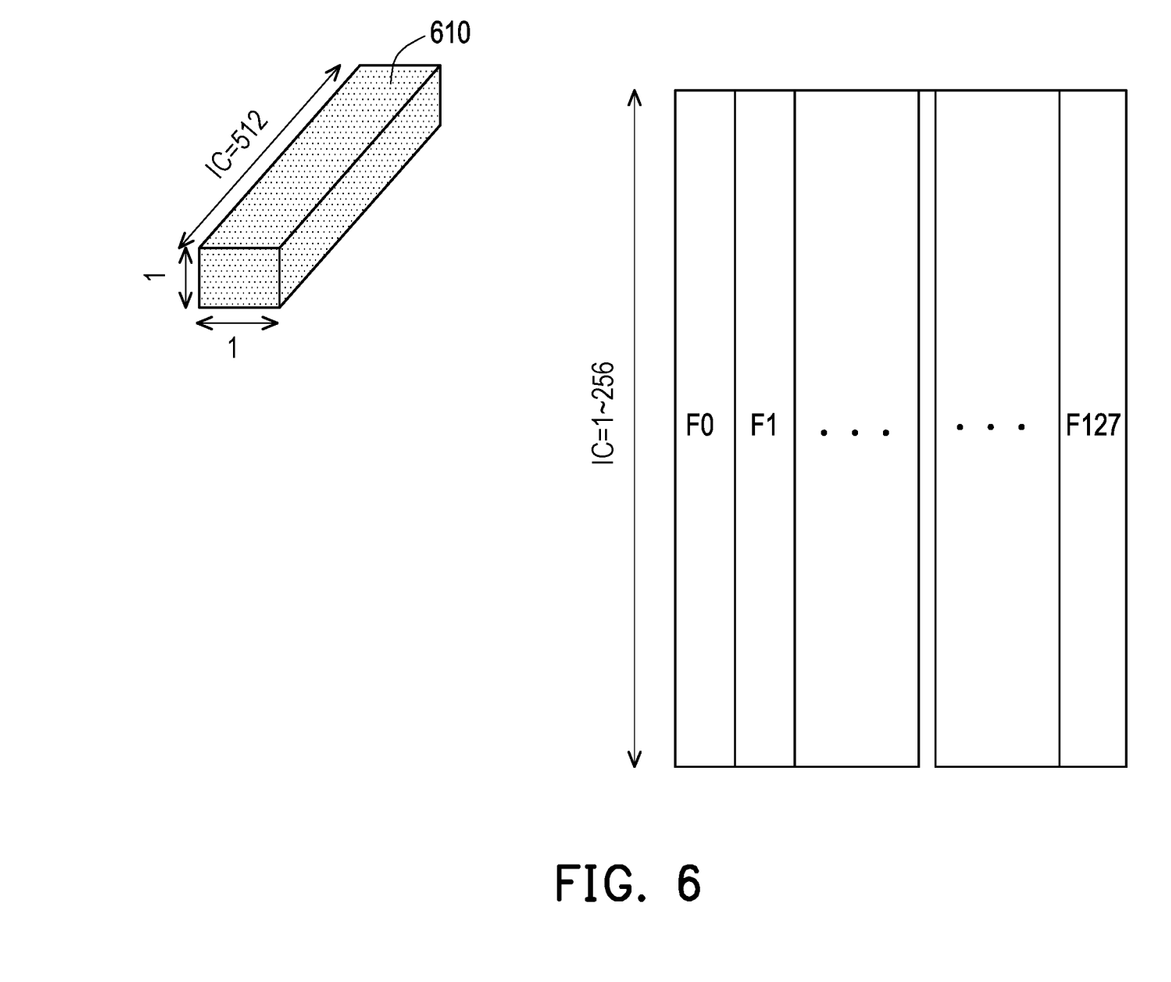
FIG. 6 illustrates a horizontal CIM arrangement in accordance with one of the exemplary embodiments of the disclosure.

Referring to FIG. 6, 128 filters F0-F127 would be loaded at a time to reduce the number of loading weights. Similarly, data of an input cube 610 is respectively input to each column of the first CIM macro and the second CIM macro for multiplication operation for the corresponding outputs.

Different products may apply different CNN architecture for data processing. For example, a surveillance system may apply a CNN architecture A for data processing, while a surgical instrument may apply a CNN architecture B for data processing. Based on configuration (i.e. OX, OY, IC, OC, FX, FY, . . . etc.) of convolutional layers of the CNN architecture a product selects, a proper CIM macro arrangement for the product can be predetermined by offline tool.

Figure 7:
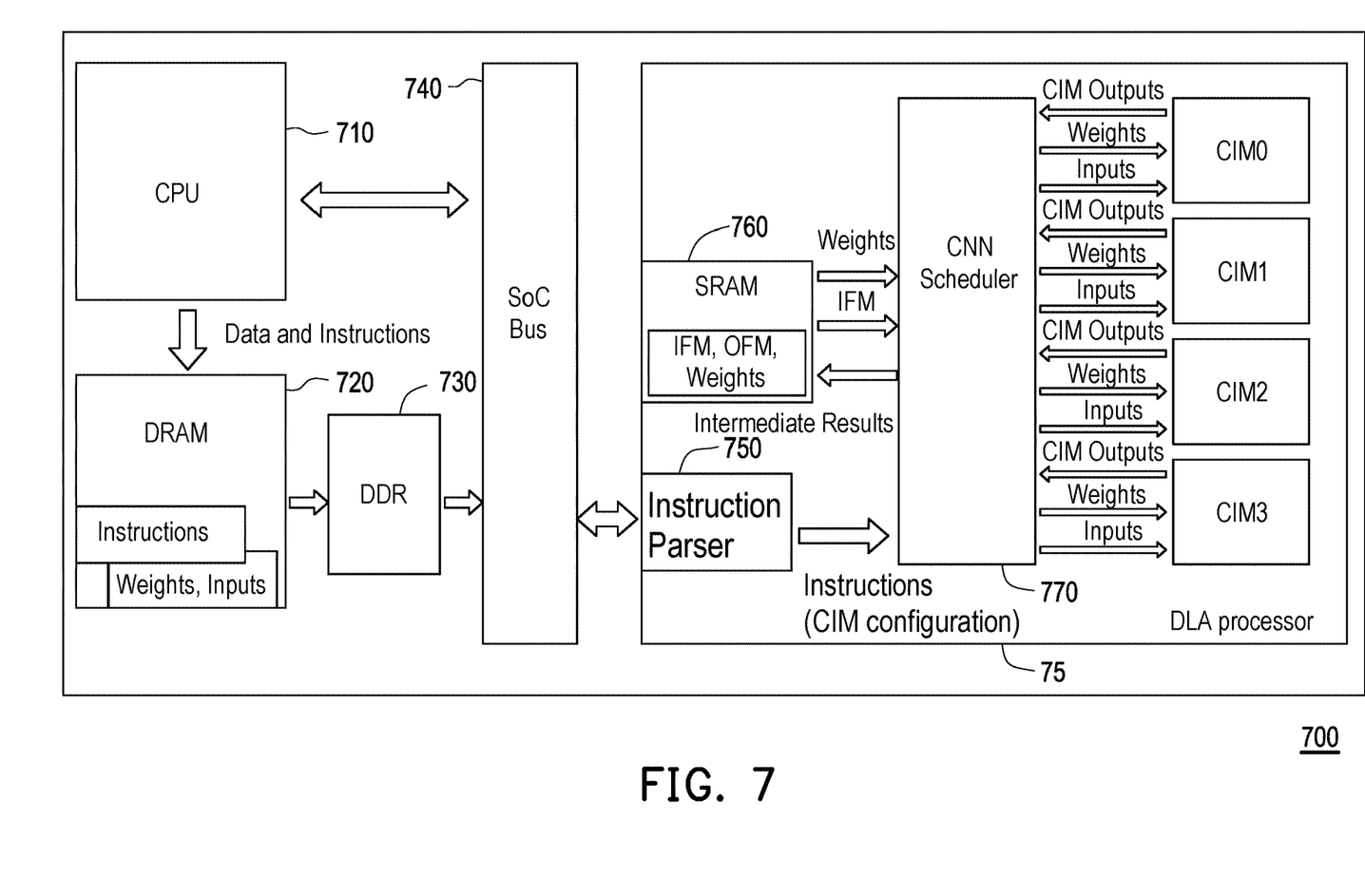
FIG. 7 illustrates a block diagram of a system performing a convolution operation in accordance with one of the exemplary embodiments of the disclosure.

Once the CIM macro arrangement for the product is determined offline, FIG. 7 illustrates a block diagram of a system performing a convolution operation in accordance with one of the exemplary embodiments of the disclosure.

Referring to FIG. 7, the CIM macros CIM0, CIM1, CIM2, and CIM3 are arranged in a predetermined CIM macro arrangement in a system 700. Weights (i.e. parameters of filters) and instructions may be stored in DRAM 720. When the system 700 receives input feature maps, a CPU 710 may trigger a CNN scheduler 770 and the CIM macros CIM0-CIM3 to perform convolution on a designated convolutional layer of a designated neural network via hardware (e.g. DRAM 720, DDR controller 730, SoC bus 740, and data linear address (DLA) processor 75). The CNN scheduler 770 may receive the weights and the input feature maps (IFM) from an on-chip SRAM 760 and the CIM configuration from an instruction parser 750, load the weights and the input feature maps into CIM0-CIM4 for convolution operation, receive CIM outputs from CIM0-CIM3, perform summation on all of the CIM outputs to generate intermediate results as output feature maps (OFM) of the current convolutional layer into the SRAM 760, and wait for another new trigger.

Figure 8:
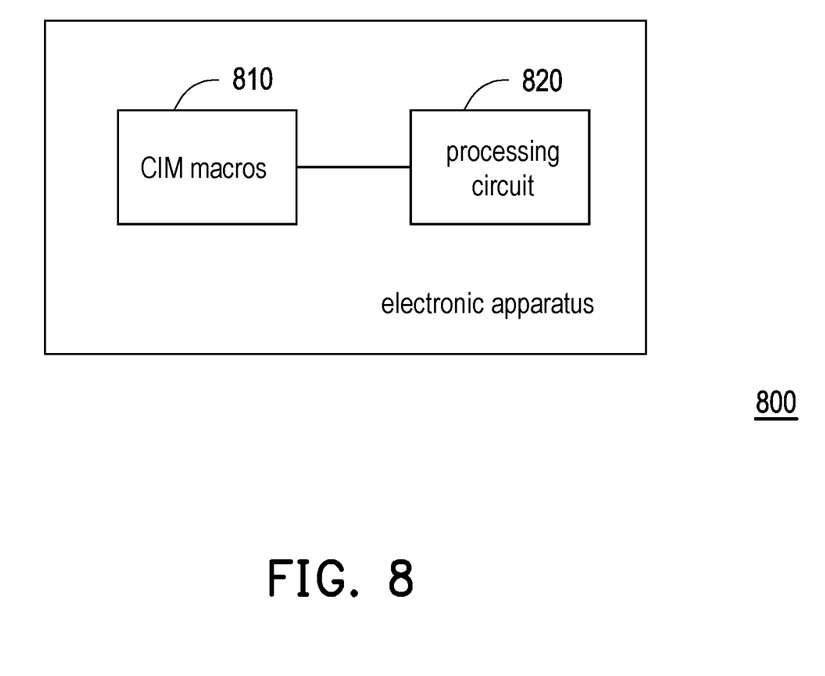
FIG. 8 illustrates a schematic diagram of a proposed electronic device in accordance with one of the exemplary embodiments of the disclosure.

In practical application, FIG. 8 illustrates a schematic diagram of a proposed electronic device in accordance with one of the exemplary embodiments of the disclosure, where the electronic device is assumed to be used by an end user.

Referring to FIG. 8, an electronic device 800 includes multiple CIM macros 810 and a processing circuit 810. The CIM macros 810 are arranged in a predetermined CIM macro arrangement based on the number of the CIM macros, the dimensions of each of the CIM macros, and the number of input channels and the number of output channels of a designated convolutional layer of a designated neural network. In the present exemplary embodiment, the predetermined CIM macro arrangement may be determined based on the method for CIM arrangement as proposed in FIG. 2. The processing circuit 810 is configured to load weights in the arranged CIM macros and input multiple input channels of one input feature map into the arranged CIM macros with the loaded weights for a convolutional operation to generate an output activation of one of output feature maps.

In an example, the weights of filters may be loaded into the CIM macros firstly, and then the input channels (the input feature maps) may be input to the CIM macros for convolutional operation. In another example, the input channels may be loaded to the CIM macros firstly, and then the weights may be input to the CIM macros for convolutional operation.

In the present exemplary embodiment, the processing circuit 810 loads the weights of multiple filters in the arranged CIM macros based on the predetermined CIM macro arrangement, the number of the filters, height and width of each kernel of each of the filters and the number of the kernels in each filter, where each of the kernels of each filter is respectively applied to a corresponding one of the input channels of the designated convolutional layer of the designated neural network.

In one exemplary embodiment, the processing circuit 820 loads each of the filters into the arranged CIM macros columnwisely. The processing circuit 820 may determine whether to batch loads the weights of the filters in the arranged CIM macros based on the height and width of each kernel and a summation of a horizontal dimension of the arranged CIM macro.

The disclosure also provides a non-transitory computer readable recording medium, which records computer program to be loaded into a computer system to execute the steps of the proposed method. The computer program is composed of multiple program instructions. Once the program sections are loaded into the computer system and executed by the same, the steps of the proposed method would be accomplished.

In view of the aforementioned descriptions, the proposed technique allows to effectively use multiple CIM macros with an optimum configuration to maximize computation performance.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for compute-in-memory (CIM) macro arrangement comprising:
   obtaining information of the number of a plurality of CIM macros and information of a dimension of each of the CIM macros;
   obtaining information of the number of a plurality of input channels and the number of a plurality of output channels of a designated convolutional layer of a designated neural network; and
   determining a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels,
   wherein the determined CIM macro arrangement provides a summation of a vertical dimension of the CIM macros adapted for performing convolution of a plurality of filters and the input channels of the designated convolution layer by a minimum number of times for batch loading the input channels.

2. The method according to claim 1, wherein the step of determining the CIM macro arrangement according to the number of the CIM macros, the dimensions of each of the CIM macros, and the number of the input channels and the number of the output channels of the designated convolutional layer of the designated neural network comprises:
   determining the CIM macro arrangement capable of performing the convolution of the filters and the input channels according to latency, energy consumption, and utilization.

3. The method according to claim 2,
   wherein the latency is associated with at least one of a DRAM latency, a latency for loading weights into the CIM macros, and a processing time of the CIM macros,
   wherein the energy consumption is associated with energy cost for accessing at least one memory including an on-chip SRAM which is in a same chip as the CIM macros and a DRAM outside the chip, and
   wherein the utilization is a ratio of used part of the CIM macros to all of the CIM macros.

4. The method according to claim 1, wherein the determined CIM macro arrangement further provides a summation of a horizontal dimension of the CIM macros adapted for performing the convolution of the filters and the input channels of the designated convolution layer by a minimum number of times for batch loading the filters.

5. An electronic apparatus comprising:
   a plurality of compute-in-memory (CIM) macros, wherein the CIM macros are arranged in a predetermined CIM macro arrangement based on the number of the CIM macros, the dimensions of each of the CIM macros, and the number of a plurality of input channels and the number of a plurality of output channels of a designated convolutional layer of a designated neural network, wherein the predetermined CIM macro arrangement provides a summation of a vertical dimension of the CIM macros adapted for performing convolution of a plurality of filters and the input channels of the designated convolution layer by a minimum number of times for batch loading the input channels; and
   a processing circuit, configured to:
      load weights in the arranged CIM macros; and
      input a plurality of input channels of one input feature map into the arranged CIM macros with the loaded weights for a convolutional operation to generate an output activation of one of a plurality of output feature maps.

6. The electronic apparatus according to claim 5,
   wherein the processing circuit loads the weights of the filters in the arranged CIM macros based on the predetermined CIM macro arrangement, the number of the filters, height and width of each kernel of a plurality of kernels of each of the filters and the number of the kernels in each filter, wherein each of the kernels of each filter is respectively applied to a corresponding one of the input channels of the designated convolutional layer of the designated neural network.

7. The electronic apparatus according to claim 5,
   wherein the processing circuit loads each of the filters into the arranged CIM macros columnwisely.

8. The electronic apparatus according to claim 5,
   wherein the processing circuit determines whether to batch loads the weights of the plurality of filters in the arranged CIM macros based on the height and width of each kernel and a summation of a horizontal dimension of the arranged CIM macro.

9. A non-transitory computer readable medium storing a program causing a computer to:
   obtaining information of the number of a plurality of CIM macros and information of a dimension of each of the CIM macros;
   obtaining information of the number of a plurality of input channels and the number of a plurality of output channels of a designated convolutional layer of a designated neural network; and
   determining a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels,
   wherein the determined CIM macro arrangement provides a summation of a vertical dimension of the CIM macros adapted for performing convolution of a plurality of filters and the input channels of the designated convolution layer by a minimum number of times for batch loading the input channels.

10. A method for compute-in-memory (CIM) macro arrangement comprising:
    obtaining information of the number of a plurality of CIM macros and information of a dimension of each of the CIM macros;
    obtaining information of the number of a plurality of input channels and the number of a plurality of output channels of a designated convolutional layer of a designated neural network; and determining a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels, wherein the determined CIM macro arrangement provides a summation of a horizontal dimension of the CIM macros adapted for performing convolution of a plurality of filters and the input channels of the designated convolution layer by a minimum number of times for batch loading the filters.

11. An electronic apparatus comprising:

a plurality of compute-in-memory (CIM) macros, wherein the CIM macros are arranged in a predetermined CIM macro arrangement based on the number of the CIM macros, the dimensions of each of the CIM macros, and the number of a plurality of input channels and the number of a plurality of output channels of a designated convolutional layer of a designated neural network, wherein the determined CIM macro arrangement provides a summation of a horizontal dimension of the CIM macros adapted for performing convolution of a plurality of filters and the input channels of the designated convolution layer by a minimum number of times for batch loading the filters; and a processing circuit, configured to:

load weights in the arranged CIM macros; and input a plurality of input channels of one input feature map into the arranged CIM macros with the loaded weights for a convolutional operation to generate an output activation of one of a plurality of output feature maps.

12. A non-transitory computer readable medium storing a program causing a computer to:

obtaining information of the number of a plurality of CIM macros and information of a dimension of each of the CIM macros;

obtaining information of the number of a plurality of input channels and the number of a plurality of output channels of a designated convolutional layer of a designated neural network; and determining a CIM macro arrangement for arranging the CIM macros according to the number of the CIM macros, the dimension of each of the CIM macros, the number of the input channels and the number of the output channels of the designated convolutional layer of the designated neural network, for applying convolution operation to the input channels to generate the output channels, wherein the determined CIM macro arrangement provides a summation of a horizontal dimension of the CIM macros adapted for performing convolution of a plurality of filters and the input channels of the designated convolution layer by a minimum number of times for batch loading the filters.

* * * * *